United States Patent Office 3,631,193
Patented Dec. 28, 1971

3,631,193
TRIS(DIMETHYLHYDROGENSILOXY) - 3,3,3-TRIFLUOROPROPYLSILANE VINYLTRIACETOXYSILANE ADDUCTS
Donald G. Young, Glendale, Ky., assignor to Dow Corning Corporation, Midland, Mich.
No Drawing. Filed Apr. 20, 1970, Ser. No. 30,345
Int. Cl. C07f 7/02; C23c 11/06
U.S. Cl. 260—448.2 R    4 Claims

ABSTRACT OF THE DISCLOSURE

Adducts of tris(dimethylhydrogensiloxy) - 3,3,3 - trifluoropropylsilane with vinyltriacetoxysilane are useful in preparing primers to adhere poly-3,3,3-trifluoropropylmethylsiloxane based elastomers to epoxy resins and polyurethane and a primer to adhere poly-3,3,3-trifluoropropylmethylsiloxane based elastomers to titanium. Illustrative of the adducts is

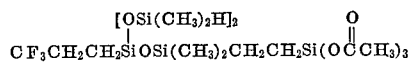

This invention relates to organosilicon compounds. More specifically, to adducts of tris(dimethylhydrogensiloxy) - 3,3,3 - trifluoropropylsilane and vinyltriacetoxysilane.

This invention relates to an organosilicon compound of the formula $$CF_3CH_2CH_2Si[OSi(CH_3)_2X]_3$$

The tris(dimethylhydrogensiloxy)-3,3,3-trifluoropropylsilane, $CF_3CH_2CH_2Si[OSi(CH_3)_2H]_3$ can be prepared by hydrolyzing a mixture of dimethylchlorosilane and 3,3,3-trifluoropropyltrichlorosilane, as further described in Example 1 of U.S. Pat. No. 3,344,160 which is hereby incorporated by reference.

The adducts of tris(dimethylhydrogensiloxy)-3,3,3-trifluoropropylsilane and vinyltriacetoxysilane can be prepared by mixing the corresponding mole ratios desired in the final adducts in the presence of a platinum catalyst. When it is desired to form the adduct of one mole of tris (dimethylhydrogensiloxy)-3,3,3 - trifluoropropylsilane and three moles of vinyltriacetoxysilane, an excess of vinyltriacetoxysilane is preferably used to insure complete reaction and a high yield, such an excess being four moles of vinyltriacetoxysilane. The reaction mixture is preferably heated at 100° C. for one hour in the presence of a chloroplatinic acid catalyst. Other reaction times and temperatures are also suitable.

The adducts of this invention are useful as primers in adhering silicone elastomers to titanium, in particular, room temperature vulcanizable silicone elastomers based on poly-3,3,3-trifluoropropylmethylsiloxane. The adducts of this invention are also useful as a component in primer compositions comprising organic solvent, tetrabutyltitanate, an ethylpolysilicate and the adduct, to adhere silicone elastomers to polyurethanes and epoxy resins.

The following examples are presented for illustrative purposes only and should not be construed as limiting the present invention which is properly delineated in the claims.

EXAMPLE

The following mixtures were heated for one hour at 100° C. in the presence of a chloroplatinic acid catalyst. The products obtained were as shown in the table.

| Mixture (moles) | | Product |
|---|---|---|
| $CF_3CH_2CH_2Si[OSi(CH_3)_2H]_3$ | $CH_2{=}CHSi(O\overset{O}{\overset{\|}{C}}CH_3)_3$ | |
| 1 | 1 | $CF_3CH_2CH_2\underset{\underset{OSi(CH_3)_2H}{\|}}{\overset{\overset{OSi(CH_3)_2H}{\|}}{Si}}OSi(CH_3)_2CH_2CH_2Si(O\overset{O}{\overset{\|}{C}}CH_3)_3$ |
| 1 | 2 | $CF_3CH_2CH_2\underset{\underset{OSi((CH_3)_2CH_2CH_2Si(O\overset{O}{\overset{\|}{C}}CH_3)_3}{\|}}{\overset{\overset{OSi(CH_3)_2H}{\|}}{Si}}OSi(CH_3)_2CH_2CH_2Si(O\overset{O}{\overset{\|}{C}}CH_3)_3$ |
| 1 | 4 | $CF_3CH_2CH_2\underset{\underset{OSi(CH_3)_2CH_2CH_2Si(O\overset{O}{\overset{\|}{C}}CH_3)_3}{\|}}{\overset{\overset{OSi(CH_3)_2CH_2CH_2Si(O\overset{O}{\overset{\|}{C}}CH_3)_3}{\|}}{Si}}OSi(CH_3)_2CH_2CH_2Si(O\overset{O}{\overset{\|}{C}}CH_3)_3$ | wherein each X is a monovalent radical selected from the group consisting of a hydrogen atom and

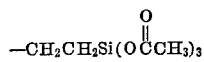

and at least one X is a

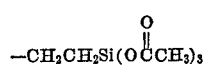

That which is claimed is:
1. An organosilicon compound of the formula $$CF_3CH_2CH_2Si[OSi(CH_3)_2X]_3$$

wherein each X is a monovalent radical selected from the group consisting of a hydrogen atom and a

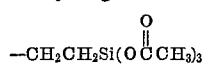

radical and at least one X is a

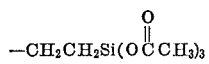

radical.

2. The organosilicon compound of claim 1 in which one X is a

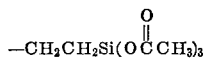

radical.

3. The organosilicon compound of claim 1 in which two X are

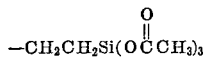

radicals.

4. The organosilicon compound of claim 1 in which all the X are

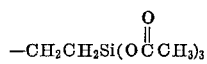

radicals.

References Cited

UNITED STATES PATENTS

| 3,317,460 | 5/1967 | Clark et al. | 260—448.2 R |
| 3,322,722 | 5/1967 | Eynouv | 260—448.2 R |
| 3,458,554 | 7/1969 | Haluska | 260—448.2 R |

TOBIAS E. LEVOW, Primary Examiner

W. F. W. BELLAMY, Assistant Examiner

U.S. Cl. X.R.

117—235.1